United States Patent
Maresh et al.

(10) Patent No.: US 10,336,445 B2
(45) Date of Patent: Jul. 2, 2019

(54) HIGH FLAPPING YOKE HUB ASSEMBLY USING A CYLINDRICAL ELASTOMERIC ATTACHMENT TO AVOID HOLES

(71) Applicant: Bell Helicopter Textron Inc., Fort Worth, TX (US)

(72) Inventors: Andrew Maresh, Lewisville, TX (US); Frank Bradley Stamps, Colleyville, TX (US); Andrew Haldeman, Fort Worth, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 603 days.

(21) Appl. No.: 13/797,334

(22) Filed: Mar. 12, 2013

(65) Prior Publication Data
US 2014/0271199 A1 Sep. 18, 2014

(51) Int. Cl.
*B64C 27/33* (2006.01)
*B64C 27/48* (2006.01)
(Continued)

(52) U.S. Cl.
CPC .............. *B64C 27/33* (2013.01); *B64C 11/02* (2013.01); *B64C 27/35* (2013.01); *B64C 27/48* (2013.01); *Y10T 29/49316* (2015.01)

(58) Field of Classification Search
CPC ......... B64C 27/33; B64C 27/32; B64C 27/48; B64C 11/02; B64C 11/04; B64C 11/12; B64C 27/35; Y10T 29/49316; F03B 1/067
(Continued)

(56) References Cited

U.S. PATENT DOCUMENTS

| | | | |
|---|---|---|---|
| 3,874,815 A | 4/1975 | Baskin | |
| 4,008,980 A | * 2/1977 | Noehren | B64C 27/33 416/134 A |

(Continued)

FOREIGN PATENT DOCUMENTS

| | | |
|---|---|---|
| EP | 0022918 | 1/1981 |
| EP | 0097885 | 1/1984 |

(Continued)

OTHER PUBLICATIONS

Foreign Communication From a Counterpart Application, European Application No. 13168626.3, Extended European Search Report dated Nov. 11, 2013, 9 pages.

(Continued)

*Primary Examiner* — Essama Omgba
*Assistant Examiner* — Stephen Mick

(57) ABSTRACT

An apparatus comprising a rotor yoke comprising two longitudinal side portions interconnected by two outboard portions, wherein a center portion of each longitudinal side portion comprises a build-up of material that is configured to accommodate a yoke hub clamp. Included is an apparatus comprising a rotor yoke comprising two longitudinal side portions interconnected by two outboard portions, wherein no apertures pass through the two longitudinal side portions and the two outboard portions. Also included is a method of coupling aircraft blades comprising providing a rotor yoke comprising two longitudinal side portions interconnected by two outboard portions, wherein no apertures pass through the two longitudinal side portions and the two outboard portions.

11 Claims, 7 Drawing Sheets

(51) Int. Cl.
*B64C 27/35* (2006.01)
*B64C 11/02* (2006.01)

(58) Field of Classification Search
USPC ................ 416/134 A, 140, 141, 230, 244 R
See application file for complete search history.

(56) References Cited

U.S. PATENT DOCUMENTS

| | | | |
|---|---|---|---|
| 4,047,839 A * | 9/1977 | Ferris | B64C 27/33 |
| | | | 416/134 A |
| 4,227,857 A * | 10/1980 | Reyes | B64C 27/43 |
| | | | 416/134 A |
| 4,293,276 A * | 10/1981 | Brogdon | B64C 27/33 |
| | | | 416/134 A |
| 4,349,316 A | 9/1982 | Hughes et al. | |
| 4,349,317 A | 9/1982 | Desjardins | |
| 4,369,018 A * | 1/1983 | Brunsch | B64C 27/33 |
| | | | 416/134 A |
| 4,381,902 A * | 5/1983 | Head | B64C 27/33 |
| | | | 416/134 A |
| 4,427,340 A | 1/1984 | Metzger | |
| 4,430,045 A | 2/1984 | Cresap | |
| 4,626,172 A | 12/1986 | Mouille et al. | |
| 4,650,401 A | 3/1987 | Yao | |
| 4,676,720 A | 6/1987 | Niwa | |
| 4,708,591 A * | 11/1987 | Roman | B64C 27/41 |
| | | | 416/102 |
| 4,746,272 A * | 5/1988 | Noehren | B64C 27/33 |
| | | | 416/134 A |
| 4,898,515 A | 2/1990 | Stamps et al. | |
| 4,923,276 A | 5/1990 | Wells | |
| 5,286,167 A | 2/1994 | Byrnes et al. | |
| 5,690,474 A | 11/1997 | Byrnes et al. | |
| 6,113,352 A * | 9/2000 | Certain | B64C 27/33 |
| | | | 416/104 |
| 6,196,800 B1 | 3/2001 | Bauer | |
| 7,665,969 B2 | 2/2010 | Stamps et al. | |
| 9,073,625 B1 * | 7/2015 | Ingram, III | B64C 11/12 |
| 2006/0165527 A1 * | 7/2006 | Stamps | B64C 27/48 |
| | | | 416/134 A |
| 2011/0027083 A1 | 2/2011 | Stamps | |
| 2011/0274548 A1 | 11/2011 | Stamps et al. | |
| 2013/0004311 A1 | 1/2013 | Stamps et al. | |
| 2013/0216384 A1 | 8/2013 | Stamp | |
| 2014/0271200 A1 | 9/2014 | Sutton et al. | |

FOREIGN PATENT DOCUMENTS

| | | |
|---|---|---|
| EP | 0323857 | 7/1989 |
| GB | 2001025 | 1/1979 |
| GB | 2033861 | 5/1980 |
| WO | 2007/106064 | 9/2007 |

OTHER PUBLICATIONS

Communication Pursuant to Article 94(3) EPCT issued in European Application No. 13168626.3 dated Mar. 18, 2014; 4 pages.
European Search Report issued in European Application No. 13180136.7 dated May 13, 2014, 5 pages.
Communication pursuant to Article 94(3) EPC issued in European Appplication No. 13180136.7 dated May 23, 2014, 6 pages.
Communication under Rule 71(3) EPC issued in European Application No. 13168626.3 dated Sep. 15, 2014; 35 pages.
Invitation pursuant to Rule 62a(1) EPC issued in European Application No. 14152690.5 on Jun. 11, 2014, 4 pages.
Partial European Search Reportt issued in European Applcation No. 14152690.5 dated Oct. 9, 2014, 7 pages.
European Search Report issued in European Application No. 14152690.5 dated Mar. 5, 2015; 6 pages.
Communication Pursuant to Article 94(3) EPC issued in European Application No. 14152690.5 dated Mar. 18, 2015; 10 pages.
Sutton, Drew, et al.; "Flexing Clevis Arrangement Bolted Joint Attachment for Flexible Rotor Hub with High Offset and High Flapping;" U.S. Appl. No. 13/801,965, filed Mar. 13, 2013.
Maresh, Andrew, et al.; "Composite Rotor System Using Two Race Track Style Cantilevered Yokes;" U.S. Appl. No. 13/801,733, filed Mar. 13, 2013.
European Search Report issued in European Application No. 15188195.0 dated Apr. 22, 2016; 4 pages.
Communication Pursuant to Article 94(3) EPC issued in European Application No. 15188195.0 dated May 4, 2016; 5 pages.

* cited by examiner

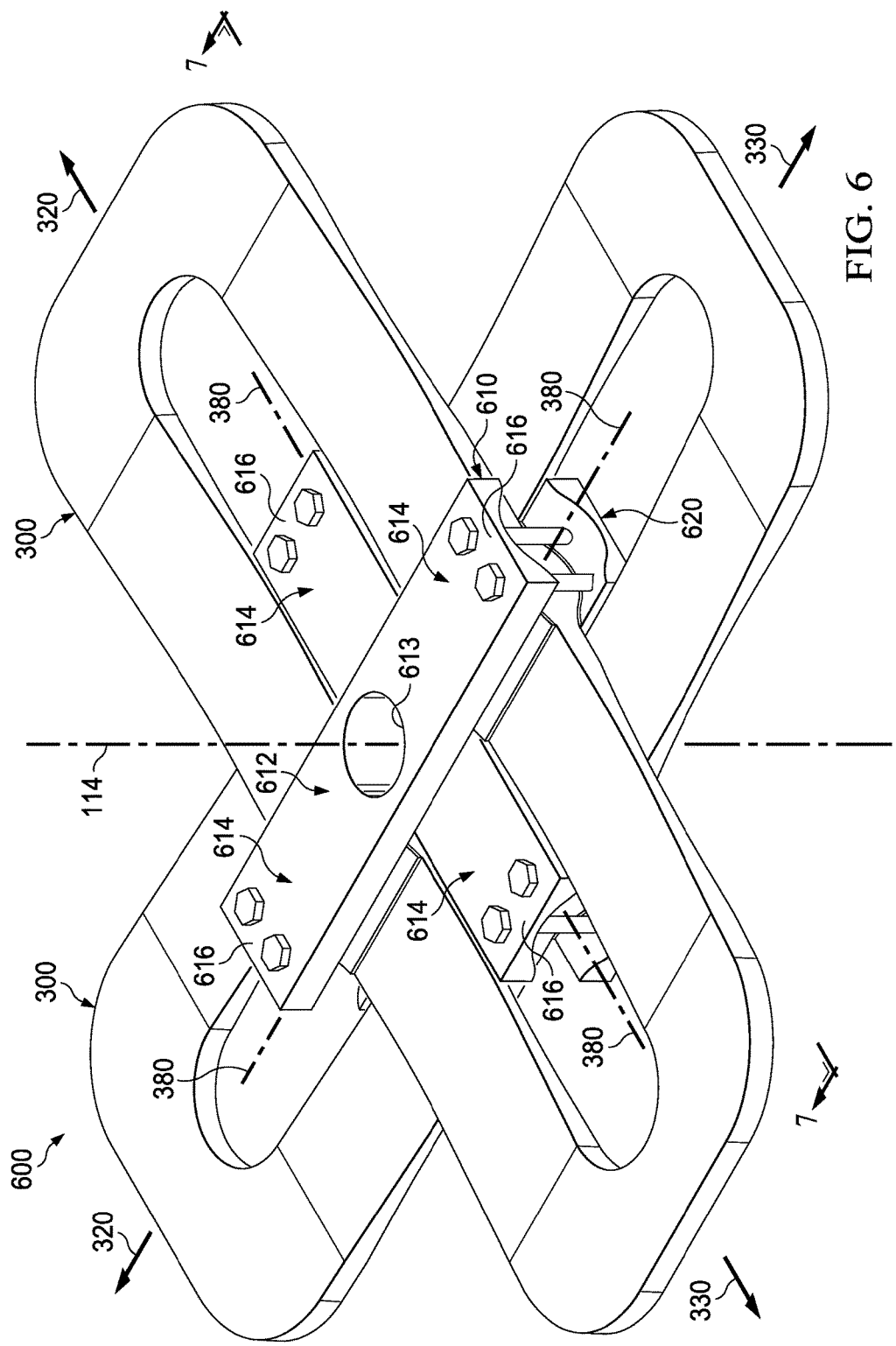

HIGH FLAPPING YOKE HUB ASSEMBLY USING A CYLINDRICAL ELASTOMERIC ATTACHMENT TO AVOID HOLES

CROSS-REFERENCE TO RELATED APPLICATIONS

Not Applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Rotary-wing aircraft employ a variety of means to interconnect a rotating rotor mast to a plurality of rotor blades, including rotor yokes. Manufacturers of rotary-wing aircraft, such as helicopters, expand the flight envelope of their rotorcraft with respect to gross weight, location of its center of gravity, and top speeds by increasing the flapping of the blades. Ultimately, blade flapping is a result of larger cyclic inputs required to achieve controlled flight as those conditions vary during flight. However, the manufacturers must still provide durable components in the power train while attempting to design as much flapping in the blades as possible. Many four-bladed helicopters use composite yokes to provide for this blade flapping motion. As the blades flap, the composite yokes bend in "flexure" regions where the composite yoke is narrower than in other areas. The composite yokes may be bolted through holes within the yokes to plates or adapters that spline back to the mast. Furthermore, the torque of the rotor is transmitted through these bolts. However, the holes create locations where stress may be concentrated that may result in the yoke's failure. Interlaminar shear strain is one such stress that accounts for a significant number of failures in these composite yokes. Therefore, these flexure regions of the composite yoke are typically located as far away from these holes to minimize impact of the stress generated from the bending generated by the blade flapping motion.

SUMMARY

In one aspect, the disclosure includes an apparatus comprising a rotor yoke comprising two longitudinal side portions interconnected by two outboard portions, wherein a center portion of each longitudinal side portion comprises a build-up of material that is configured to accommodate a yoke hub clamp.

In another aspect, the disclosure includes an apparatus comprising a rotor yoke comprising two longitudinal side portions interconnected by two outboard portions, wherein no apertures pass through the two longitudinal side portions and the two outboard portions.

In yet another aspect, the disclosure includes a method of coupling aircraft blades comprising providing a rotor yoke comprising two longitudinal side portions interconnected by two outboard portions, wherein no apertures pass through the two longitudinal side portions and the two outboard portions.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 6 is an isometric view of a yoke hub assembly according to an embodiment of the disclosure.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

A mechanism to accommodate increased flapping motion by rotary-wing aircraft blades is disclosed. The mechanism provides for a yoke hub assembly configured to provide a clamping force around a yoke that may eliminate the need for holes in the yoke. One benefit of this mechanism may be to eliminate a source of failure experienced by such yokes from stresses, such as interlaminar shear strain. Another potential benefit realized by this mechanism may be to provide a greater total flapping angle by the rotary-wing aircraft blades.

Figure 1:
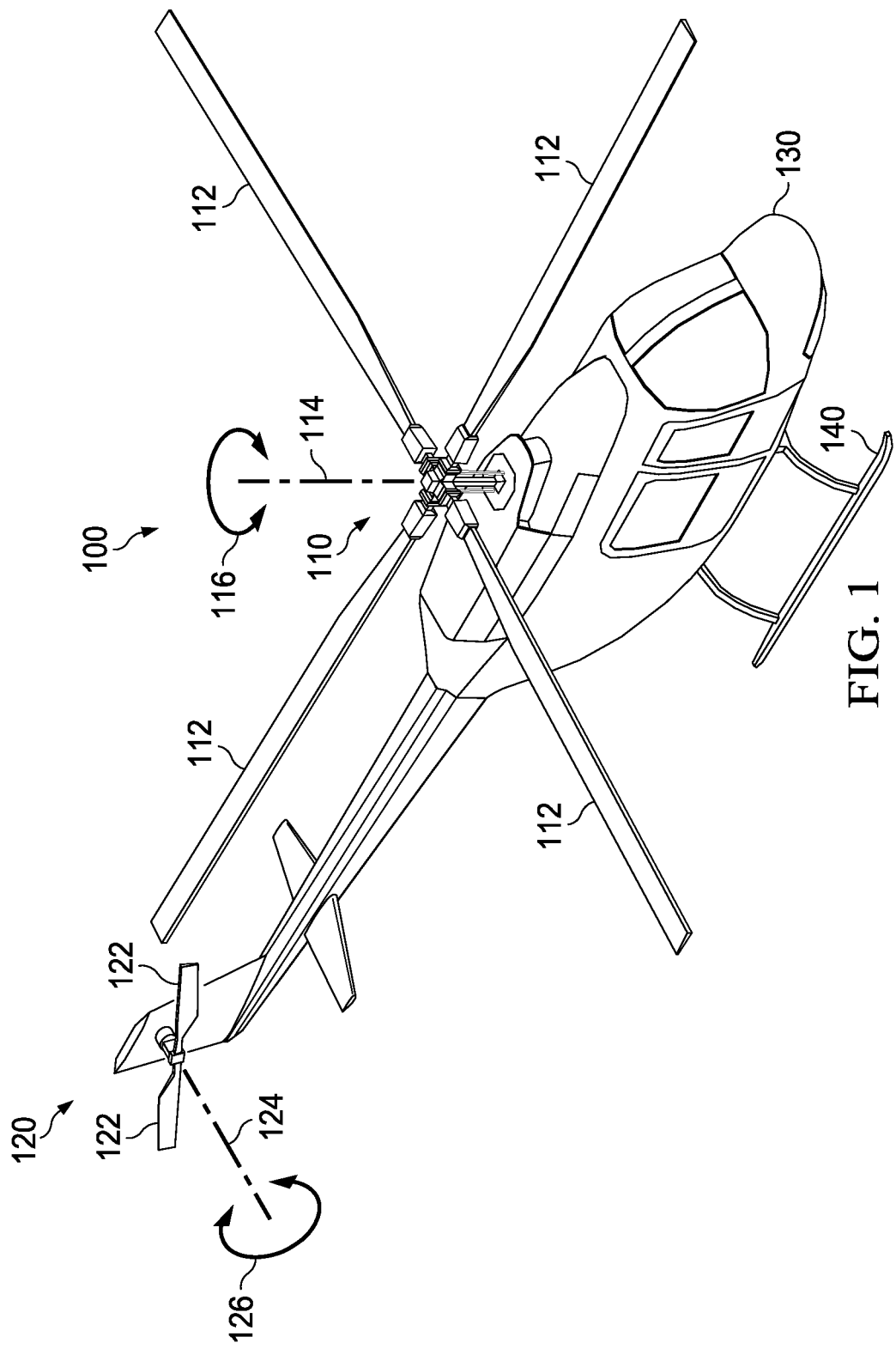
FIG. 1 is a perspective view of a helicopter according to an embodiment of the disclosure.

FIG. 1 is a perspective view of a helicopter 100. Certain embodiments of the disclosure may be used with a rotary-wing aircraft such as helicopter 100. However, it should be understood that the helicopter example is given merely for illustration purposes only. Embodiments of the present disclosure are equally applicable to all airplanes, tilt-rotor aircraft, and the disclosure should not be limited to any particular setting or application.

Helicopter 100 includes a main rotor assembly 110, a tail rotor assembly 120, a fuselage 130, and landing gear 140. Main rotor assembly 110 includes two or more blades 112 that are rotated about an axis of rotation 114 in either a clockwise direction or a counterclockwise direction as indicated by arrow 116. Main rotor assembly 110 generates a lift force that supports the weight of helicopter 100 and a thrust force that counteracts aerodynamic drag.

Tail rotor assembly 120 includes two or more blades 122 that are rotated about an axis of rotation 124 in either a clockwise direction or a counterclockwise direction as indicated by arrow 126. Tail rotor assembly 120 counters the torque effect created by main rotor assembly 110 and allows a pilot to control the direction helicopter 100 is pointed.

Fuselage 130 is the main body section of helicopter 100. Fuselage 130 optionally holds the crew, passengers, and/or cargo and houses the engine, transmission, gearboxes, drive shafts, control systems, etc. that are needed to establish an operable helicopter. Landing gear 140 is attached to fuselage 130, supports helicopter 100 on the ground, and allows it to take off and land.

Figure 2:
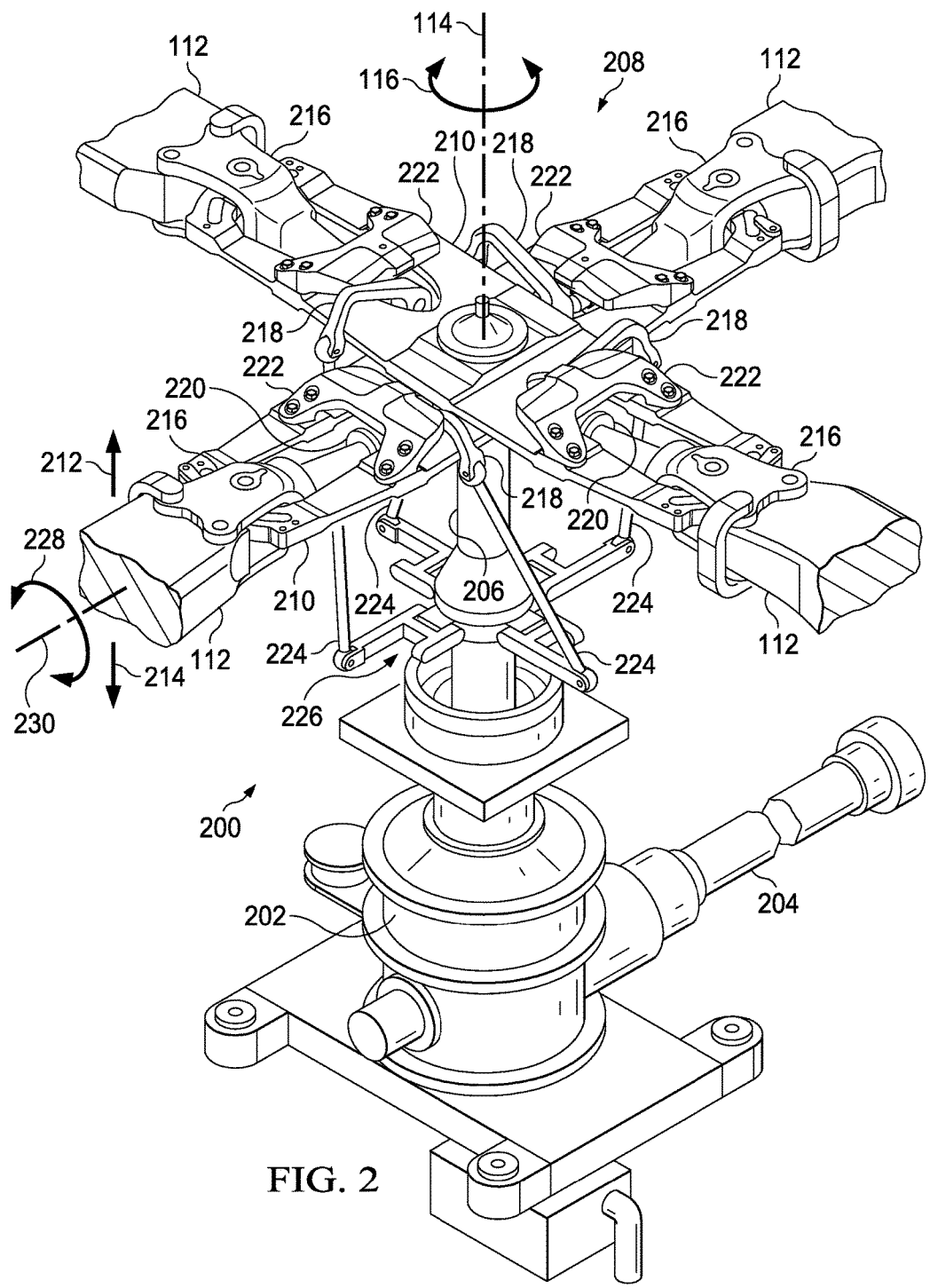
FIG. 2 is a perspective view of a power train according to an embodiment of the disclosure.

FIG. 2 is a perspective view of a power train 200. Power train 200 can be used in a rotary-wing aircraft such as helicopter 100 shown in FIG. 1. Power train 200 is not however limited to any particular setting. Additionally, it should be noted that the particular example shown in FIG. 2 shows a soft-in plane rotor system having four blades 112. Embodiments of the disclosure are not limited to any particular configuration of rotor system and blades, and embodiments may include any type of rotor system (e.g., fully articulated, rigid, semi rigid, etc.) and may include any number of blades (e.g., 2, 3, 4, 5, 6, etc.).

Power train 200 includes a transmission 202 that receives power from an engine (not shown) through a driveshaft 204. Transmission 202 drives accessories and controls the rotation 116 of mast 206 about an axis of rotation 114. Mast 206 transfers its rotational movement to blades 112 through a hub 208 that connects mast 206 to blades 112.

Hub 208 optionally includes one or more flexible yokes 210 that enable blades 112 to flap up in the direction indicated by arrow 212 and flap down in the direction indicated by arrow 214. Hub 208 may also include a main rotor grip 216 for each blade 112 that is attached to hub 208. The main rotor grip 216 includes an outboard end that attaches to a blade 112, an inboard end that attaches to a pitch horn 218, and a spindle between the outboard end and the inboard end. The spindle is supported by a shear bearing 220 that holds the spindle in place and allows it to rotate. Shear bearing 220 is in turn held in place by a bridge plate 222 that attaches shear-bearing 220 to yoke 210.

Each pitch horn 218 is connected to a pitch linkage 224. Each pitch linkage 224 is driven up and down (e.g., in the directions shown by arrows 212 and 214) by a swashplate assembly 226. Accordingly, as swashplate assembly 226 moves, it drives pitch linkage 224 which drives pitch horn 218 which rotates main rotor grip 216 about shear bearing 220. This allows the pitch of each of the blades 112 to be controlled. For instance, each blade 112 is able to rotate clockwise or counterclockwise as indicated by arrow 228 about an axis of rotation 230 that runs along the length of each blade 112.

This disclosure provides for a yoke hub assembly comprising upper and lower portions contoured to accept a plurality of flexible yokes 210 with geometrically shaped buildups towards their inboard areas. When the upper and lower portions of the yoke hub assembly are fastened together outside of the yoke, a clamping force is created that may eliminate the need for these holes. Therefore, any potential failure from stresses around the bolt holes, such as interlaminar shear strain, may also be eliminated. Another potential benefit realized by this disclosure may be the geometrically shaped buildup areas of the composite yokes create a pivot point within the yoke hub assembly. This may in turn permit blade grip and blade to flap to a greater angle than the yoke. This kinematic effect may limit yoke strain while still providing a greater total flapping angle by the blade.

Figure 3:
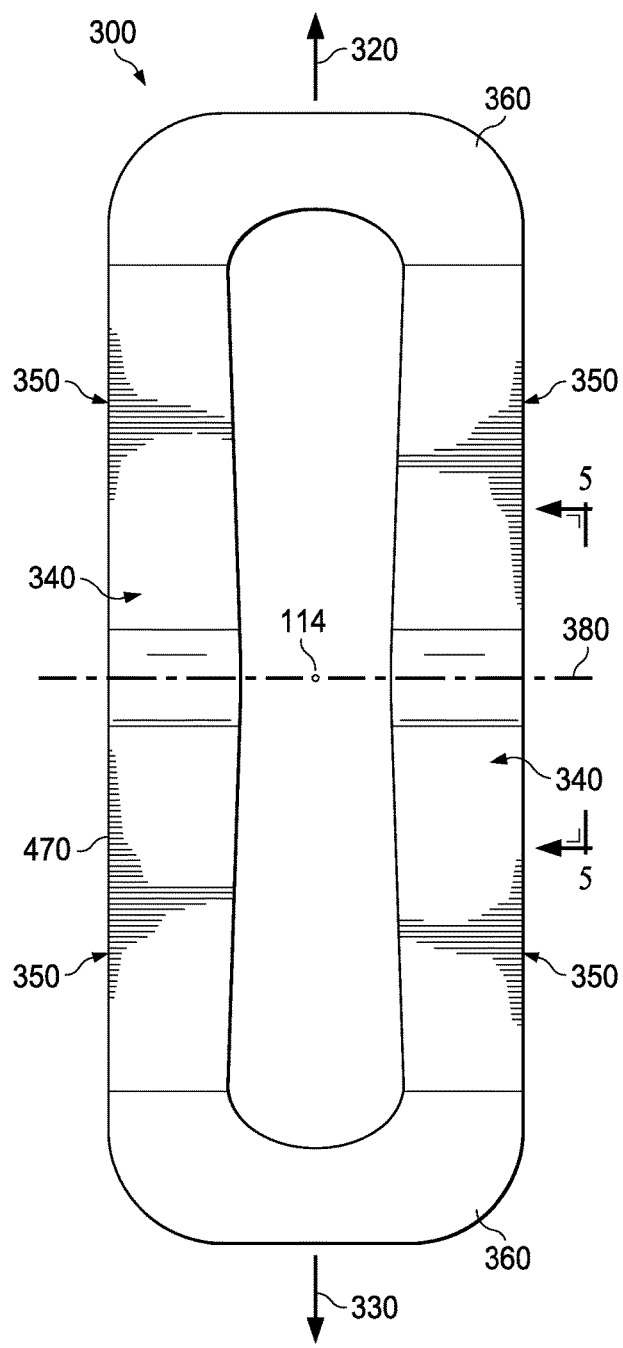
FIG. 3 is a top plan view of a loop style rotor yoke according to an embodiment of the disclosure.
Figure 4:
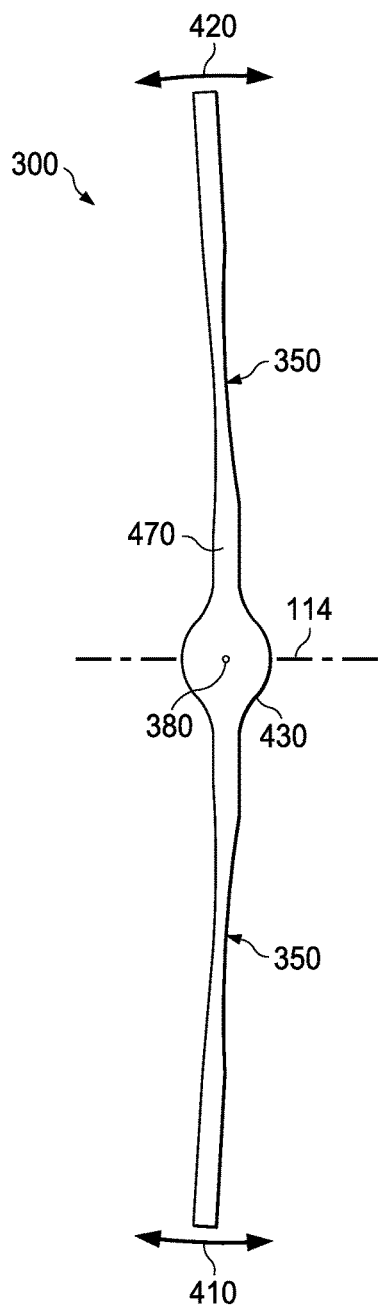
FIG. 4 is a side elevation view of the loop style rotor yoke of FIG. 3 according to an embodiment of the disclosure.

FIGS. 3 and 4 illustrate an embodiment of a loop style 300 version of a flexible yoke 210 according to the disclosure. FIG. 3 depicts a top plan view of the loop style flexible yoke 300, whereas FIG. 4 depicts a side elevation view of the loop style flexible yoke 300. Loop style flexible yoke 300 provides a means of interconnecting a mast centered at an axis of rotation 114 to a plurality of blades extending in the direction of arrows 320 and 330 via a hub in a helicopter 100. As illustrated in this embodiment, loop style flexible yoke 300 is generally configured as an elongated loop or racetrack shape, although other shapes (rectangular, circular, oval, etc.) may be used. Loop style flexible yoke 300 comprises a pair of spaced apart longitudinal side portions 470 interconnected by a pair of rounded outboard portions 360 that form the elongated loop around an axis of rotation 114. Each longitudinal side portion 470 may comprise a central portion 340 located adjacent to the axis of rotation 114 connected to a plurality of flexure portions 350 each located outboard of the central portion 340. The flexure portions 350 permit a plurality of blades of a helicopter to flap in the direction of arrows 410 and 420. The central portion 340 of the longitudinal side portion 470 may further comprise a geometrically-shaped buildup portion 430 along a lateral axis 380 that is both orthogonal to and intersects the axis of rotation 114. This disclosure uses a loop style flexible yoke only as an example. The proposed yoke hub assembly 300 is not limited to a loop style rotor yoke, but may take the form of any flexible yoke.

Figure 5A:
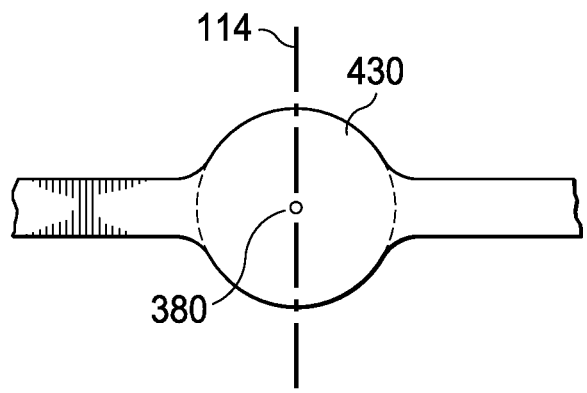
FIG. 5A is a side view of the central portion of a loop style rotor yoke of FIG. 3 as seen from the line 5-5 in FIG. 3 according to embodiments of the disclosure
Figure 5B:
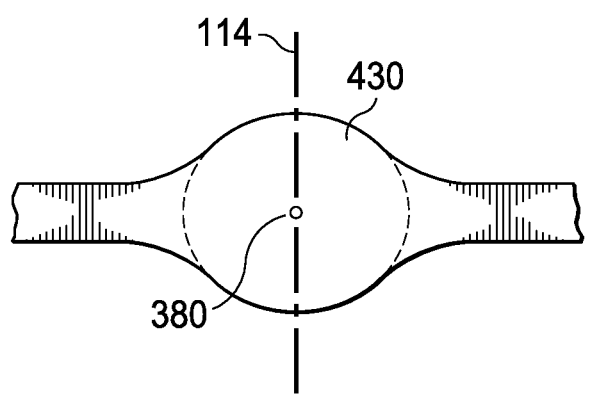
FIG. 5B is a side view of the central portion of a loop style rotor yoke of FIG. 3 as seen from the line 5-5 in FIG. 3 according to embodiments of the disclosure.

One feature this disclosure employs to permit greater flapping by the blades of a helicopter is a geometrically shaped buildup portion 430 of the central portion 340 of a plurality of loop style flexible yokes 300 when viewed along a yoke plane defined by the longitudinal side portions 470 and the outboard portions 360. The cross-section of the geometrically shaped buildup portion 430 may take the form of numerous geometric shapes, such as the geometric shapes illustrated in FIGS. 5A and 5B. FIG. 5A is a side view the central portion of a loop style flexible yoke 300, as seen from the line 5-5 in FIG. 3. FIG. 5B provides an alternative embodiment to FIG. 5A using an oval geometrically shaped buildup portion 430 instead of a circular geometrically shaped buildup portion 430. Both of these views illustrate the geometrically shaped buildup portion 430 that provides a pivot point within the yoke hub assembly 500 along an orthogonal lateral axis that intersects with the axis of rotation 114. While any shape will work, there are advantages to having rounded shapes, such as ease of manufacturing and potentially increased flapping.

Figure 7:
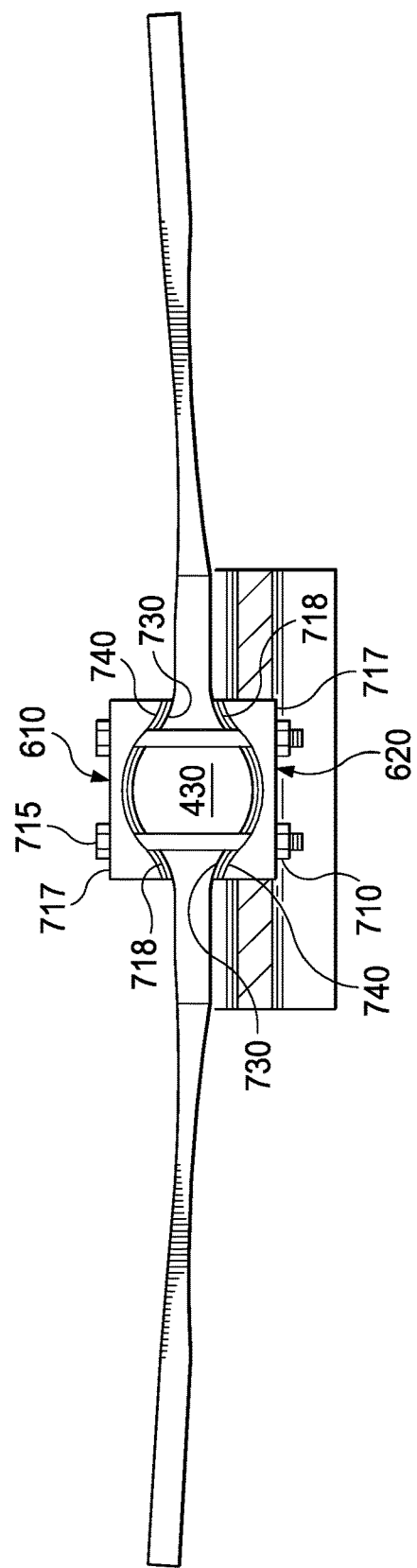
FIG. 7 is a cross-section view of the central portion of the yoke hub assembly of FIG. 6 from the perspective of line 7-7 in FIG. 6 according to an embodiment of the disclosure.

FIGS. 6 and 7 illustrate an embodiment of a yoke hub assembly 600 according to the disclosure. FIG. 6 illustrates an isometric view of the yoke hub assembly 600, whereas FIG. 7 depicts a cross-section view of the yoke hub assembly 600 from the perspective of line 7-7 in FIG. 6. Yoke hub assembly 600 comprises an upper clamping assembly 610, a lower clamping assembly 620, and a plurality of loop style flexible yokes 300. The upper clamping assembly 610 comprises an inboard section 612 and a plurality of arms 614 extending radially from the axis of rotation 114. Similarly, the lower clamping assembly 620 also comprises an inboard section 612 and a plurality of arms 614 extending radially from the axis of rotation 114.

The upper and lower clamping assembly inboard sections 612 each further comprise an aperture 613 or other attachment mechanisms that are configured to attach the yoke hub assembly 600 to the mast (not shown). Each of the upper clamping assembly arms 614 further comprises an outboard end 616, a top portion 717, and a bottom portion 718. Similarly, each of the lower clamping assembly arms 614 also further comprise an outboard end 616, a top portion 717, and a bottom portion 718. Outboard ends 616 each have one or more apertures configured to accept nuts 710 and bolts 715 or other mechanisms to provide a clamping force between the upper and lower clamping assemblies 610 and 620. The bottom portions of the upper and lower clamping assemblies 718 are contoured to accept the geometrically shaped buildup portions 430 of a loop style flexible yoke 300. Additionally, to both protect and facilitate the pivoting action of the loop style flexible yoke 300, a cushioning material 730 may be included. The cushioning material 730 may be located between the bottom portions of the upper and lower clamping assemblies 718 and the adjacent geometrically shaped buildup areas 430 of the loop style flexible yoke 300. The cushioning material 730 may be any appropriate cushioning material, including elastomeric material, rubber, and polymers, such as urethane. The density of the cushioning material 730 may also be selected by taking into account the desired cushioning durability of the cushioning material 730. Also, the cushioning material 730 may include a protective layer 740 to improve durability by mitigating frictional forces applied to the cushioning material 730 during operation. In one embodiment, the protective layer 740 may comprise a cloth imbedded in the cushioning material 730. In another embodiment, the protective layer 740 may comprise a fluorocarbon polymer fabric, such as Teflon cloth. The thickness of the cushioning material 730 may be selected by taking into account the desired cushioning characteristics.

Figure 8:
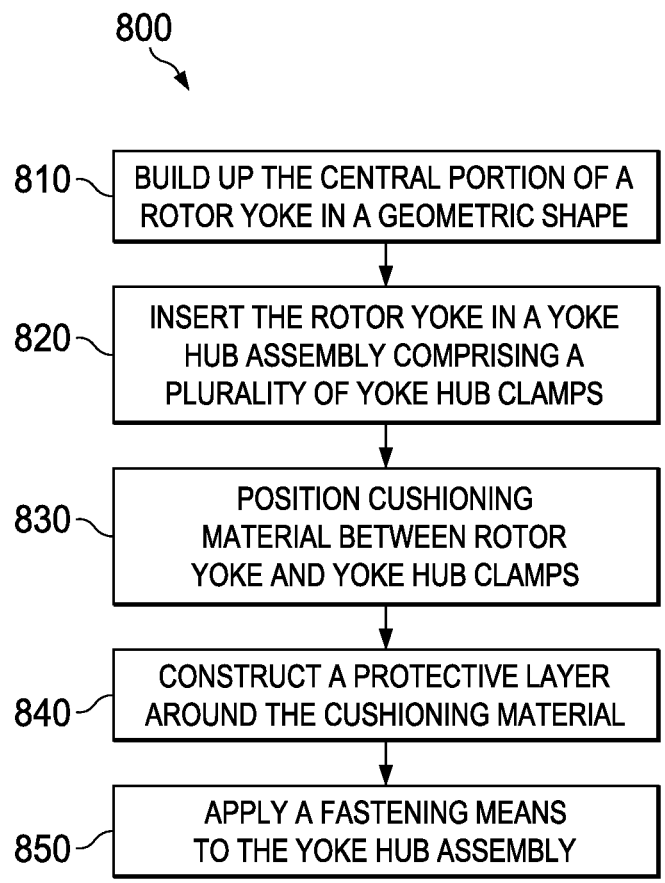
FIG. 8 is a flowchart illustrating a method of constructing a yoke assembly comprising a rotor yoke without apertures according to an embodiment of the disclosure.

Referring now to FIG. 8, an exemplary method of constructing a yoke assembly comprising a rotor yoke without apertures for coupling aircraft blades. The method 800 comprises, at block 810, building up the central portion of a rotor yoke in a geometric shape along a lateral axis that is both orthogonal to and intersects the axis of rotation. The built up area of the central portion of the rotor yoke provides a pivot point within the yoke assembly along the orthogonal lateral axis that intersects with the axis of rotation. At block 820, the rotor yoke is inserted into a yoke hub assembly comprising a plurality of yoke hub clamps. The yoke hub clamps are contoured to fit the built up area of the center portion of the rotor yoke. At block 830, the method 800 may optionally comprise positioning a cushioning material between the rotor yoke and the yoke hub clamps. At block 840, the method 800 optionally comprises constructing a protective layer around the cushioning material. At block 850, the yoke hub assembly is clamped around the rotor yoke by applying a fastening means to ensure the yoke hub assembly remains around the rotor yoke.

Figure 9:
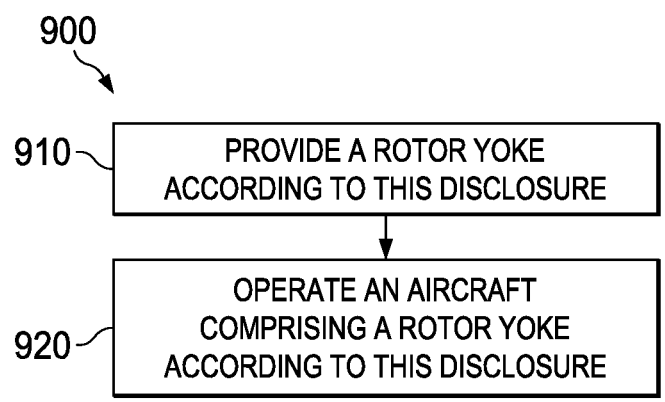
FIG. 9 is a flowchart illustrating a method for providing a yoke and operating an aircraft comprising the yoke according to an embodiment of the disclosure.

FIG. 9 illustrates an exemplary method for coupling aircraft blades according to this disclosure. The method 900 optionally comprises, at block 910, providing a rotor yoke according to this disclosure. In some embodiments, "providing" may be designing, manufacturing, or assembling the apparatus comprising a rotor yoke according to this disclosure. Then, at block 920, the method comprises operating an aircraft comprising a rotor yoke according to this disclosure.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, e.g., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
an assembly comprising a first and a second rotor yoke, each comprising:
two longitudinal side portions interconnected by and spanning between two outboard portions at each longitudinal end of the rotor yoke to form an elongated loop about an axis of rotation of the rotor yoke, wherein a center portion of each longitudinal side portion comprises a solid cylindrical or solid oval build-up of material that is integral with the yoke and that accommodates a yoke hub clamp, wherein the two longitudinal side portions are free of apertures passing through the two longitudinal side portions;
a first lower and a first upper clamp assembly that are contoured to the solid cylindrical or oval build-up of material and that transfers torque from a mast to the first rotor yoke, wherein one or more first fasteners between the first lower and first upper clamps eliminate movement of the first rotor yoke along a lateral axis of the first lower and first upper clamp assembly; and
a second lower and a second upper clamp assembly that are contoured to the solid cylindrical or oval build-up of material and that transfers torque from a mast to the second rotor yoke, wherein one or more second fasteners between the second lower and second upper clamp eliminate movement of the second rotor yoke along a lateral axis of the second lower and second upper clamp assembly.

2. The apparatus of claim 1, further comprising an aircraft fuselage comprising an engine, wherein the engine is coupled to a mast that is coupled to a yoke hub, wherein the yoke hub is coupled to a plurality of blades through the yoke, and wherein the yoke hub further comprises a yoke hub clamp rounded to accept at least one rotor yoke.

3. The apparatus of claim 2, wherein a center portion of each longitudinal side portion comprises a build-up of material that is configured to accommodate the yoke hub clamp, the center portion of each longitudinal side portion being adjacent to the axis of rotation of the rotor yoke, the center portion of each longitudinal side portion being disposed along a lateral axis that is orthogonal to and intersects the axis of rotation and is perpendicular to the longitudinal side portions.

4. The apparatus of claim 3, wherein the hub clamp does not extend past the center portion of each longitudinal side portion.

5. The apparatus of claim 3, wherein a cushioning material is positioned between the hub clamp and the build-up of material of the rotor yoke.

6. The apparatus of claim 5, wherein the cushioning material comprises rubber, an elastomeric material, or a polymer material.

7. The apparatus of claim 5, wherein the cushioning material is surrounded by a protective layer.

8. The apparatus of claim 1, wherein the build-up of material provides a pivot point along the lateral axis, the rotor yoke configured to pivot about the pivot point.

9. The apparatus of claim 1, further comprising the yoke hub clamp configured to accept the build-up of material of the rotor yoke.

10. The apparatus of claim 9, wherein the build-up of material is pivotally coupled to the yoke hub clamp to provide a pivot point along the lateral axis, the rotor yoke configured to pivot about the pivot point.

11. The apparatus of claim 9, wherein the yoke hub clamp comprises an upper clamping assembly and a lower clamping assembly, wherein the upper clamping assembly is contoured to accept an upper surface of the build-up of material, and wherein the lower clamping assembly is contoured to accept a lower surface of the build-up of material.

* * * * *